United States Patent
Nakata

(10) Patent No.: US 10,647,534 B2
(45) Date of Patent: May 12, 2020

(54) SHEET TRANSPORT DEVICE, IMAGE READING DEVICE, AND IMAGE FORMING APPARATUS

(71) Applicant: FUJI XEROX CO., LTD., Tokyo (JP)

(72) Inventor: Ryusuke Nakata, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 16/170,071

(22) Filed: Oct. 25, 2018

(65) Prior Publication Data

US 2019/0300312 A1 Oct. 3, 2019

(30) Foreign Application Priority Data

Apr. 3, 2018 (JP) ................. 2018-071285

(51) Int. Cl.
| | | |
|---|---|---|
| *B65H 7/12* | (2006.01) | |
| *G03G 15/00* | (2006.01) | |
| *B65H 5/06* | (2006.01) | |
| *B65H 3/66* | (2006.01) | |
| *H04N 1/00* | (2006.01) | |

(52) U.S. Cl.
CPC ............... *B65H 7/125* (2013.01); *B65H 3/66* (2013.01); *B65H 5/062* (2013.01); *G03G 15/6529* (2013.01); *H04N 1/00588* (2013.01); *H04N 1/00602* (2013.01); *H04N 1/00615* (2013.01); *H04N 1/00631* (2013.01)

(58) Field of Classification Search
CPC .......... B65H 2553/30; B65H 2404/144; B65H 2404/1441; B65H 2404/1442; B65H 3/66; B65H 7/125; B65H 2404/152; G03G 2215/00544

See application file for complete search history.

(56) References Cited

U.S. PATENT DOCUMENTS

| | | | | |
|---|---|---|---|---|
| 5,345,295 A | * | 9/1994 | Takano | G03G 15/6535 399/125 |
| 7,201,370 B2 | * | 4/2007 | Hiramitsu | B65H 7/125 271/186 |
| 7,434,802 B2 | * | 10/2008 | Yamamoto | B65H 5/06 271/188 |
| 7,448,621 B2 | * | 11/2008 | Yasumoto | G03G 15/6529 271/264 |
| 8,172,214 B2 | * | 5/2012 | Kubota | B42C 1/125 270/58.07 |
| 8,452,224 B2 | * | 5/2013 | Ishioka | B65H 5/062 399/16 |

(Continued)

FOREIGN PATENT DOCUMENTS

| | | |
|---|---|---|
| JP | 2005001828 | 1/2005 |
| JP | 2009298599 | 12/2009 |

*Primary Examiner* — Jeremy R Severson
(74) *Attorney, Agent, or Firm* — JCIPRNET

(57) ABSTRACT

A sheet transport device includes a sheet transport path along which at least one sheet is transported to a nip defined by a fixing roller and a displacement roller, a sensing unit disposed on the sheet transport path, an opening and closing member that is movable between a closed position at which the sheet transport path is formed and an open position at which the sheet transport path is exposed, and a guide member that is attached to the opening and closing member and that moves by following displacement of the displacement roller in such a manner as to maintain a certain distance from the sensing unit.

7 Claims, 11 Drawing Sheets

(56) References Cited

U.S. PATENT DOCUMENTS

| | | | |
|---|---|---|---|
| 10,124,973 B2* | 11/2018 | Hari | B65H 5/38 |
| 2007/0069456 A1* | 3/2007 | Jeong | B65H 5/062 |
| | | | 271/272 |

* cited by examiner

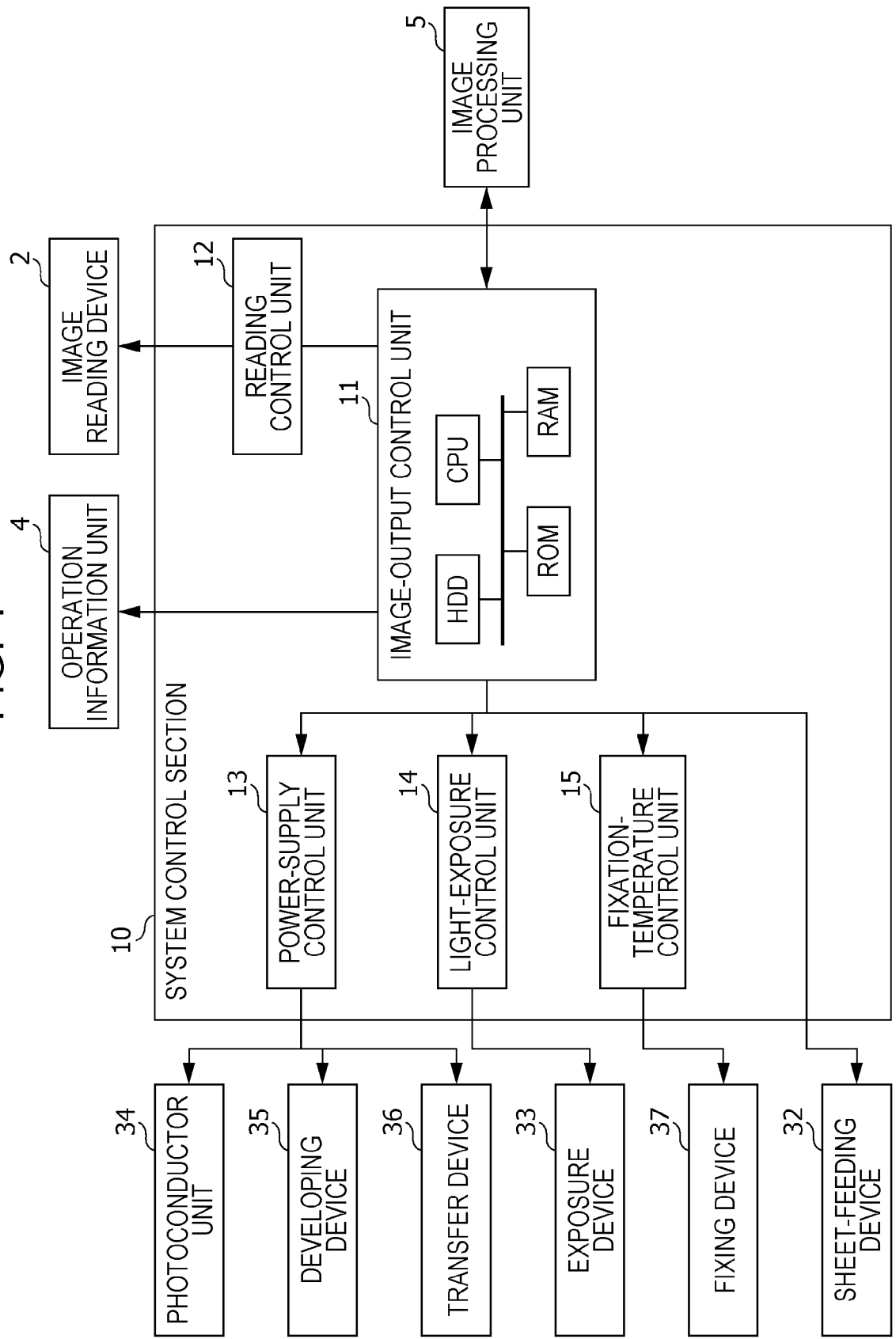

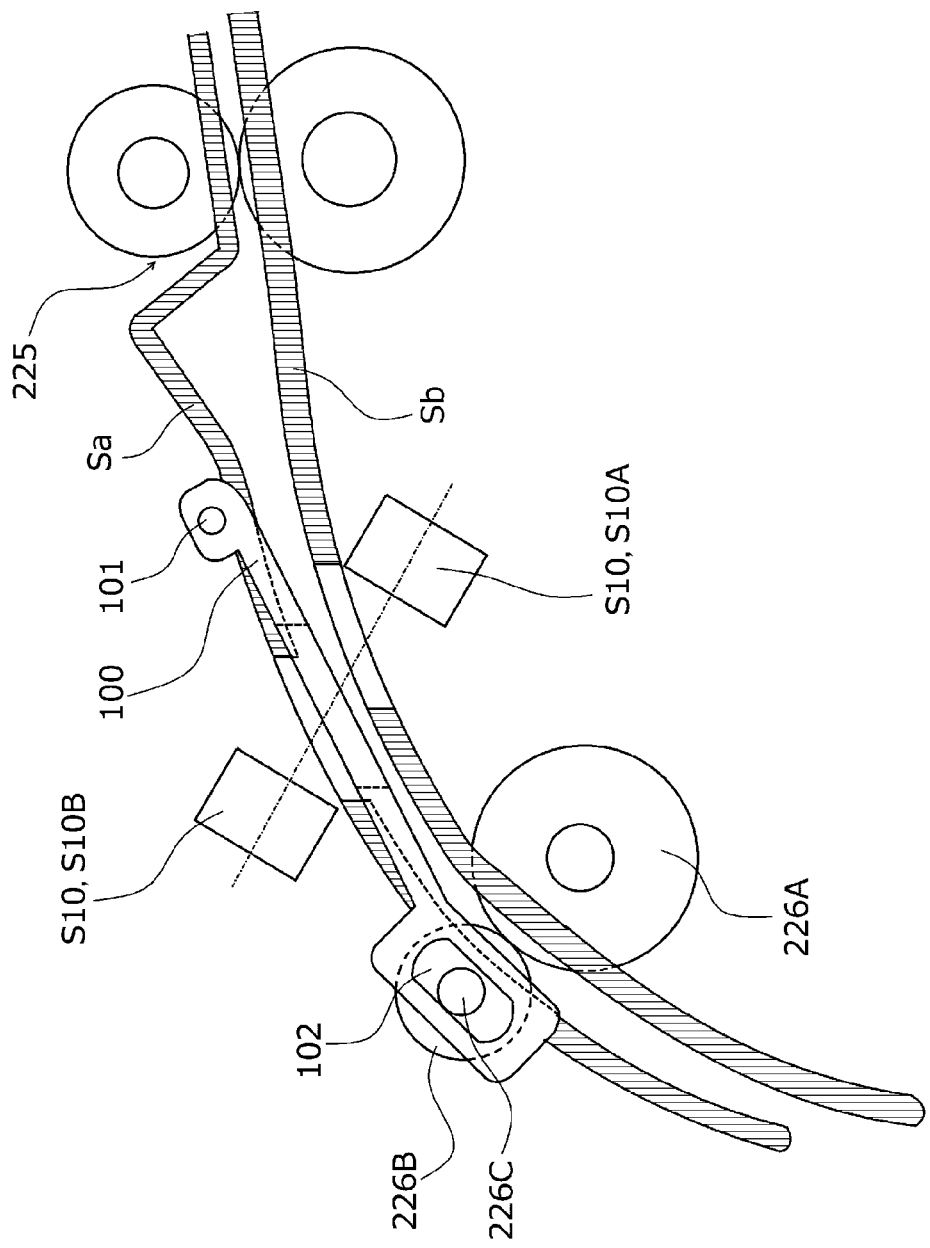

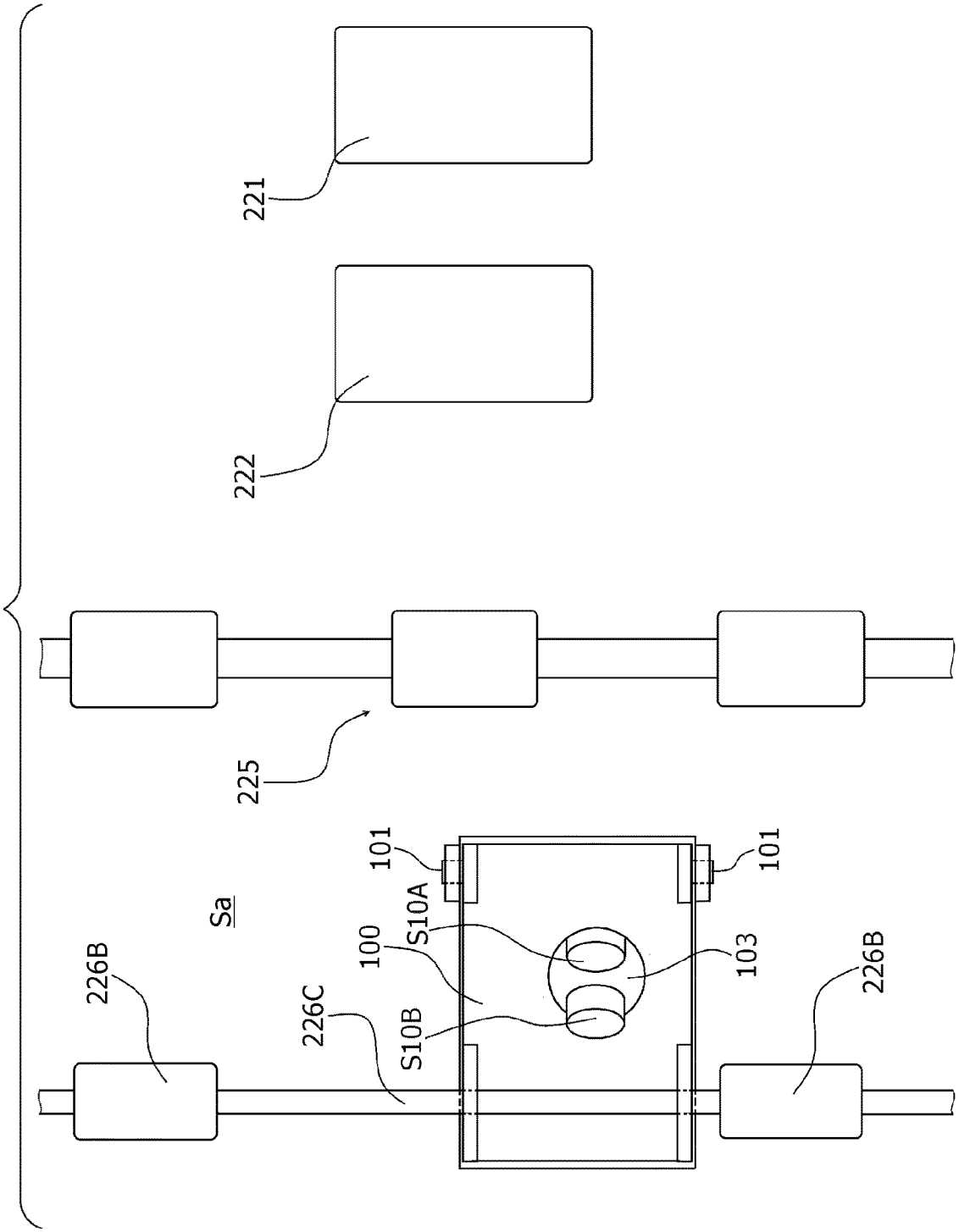

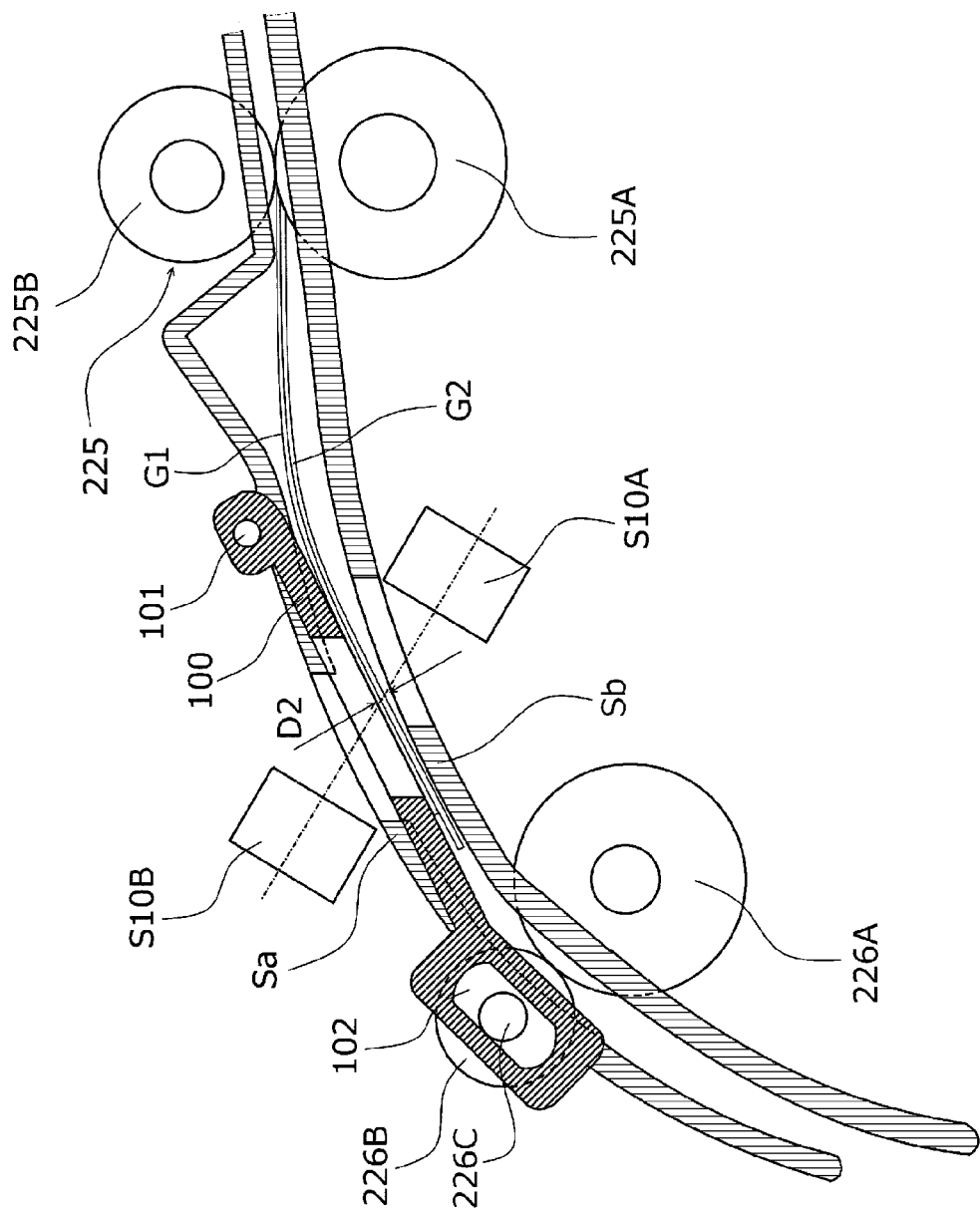

SHEET TRANSPORT DEVICE, IMAGE READING DEVICE, AND IMAGE FORMING APPARATUS

CROSS-REFERENCE TO RELATED APPLICATIONS

This application is based on and claims priority under 35 USC 119 from Japanese Patent Application No. 2018-071285 filed Apr. 3, 2018.

BACKGROUND

(i) Technical Field

The present disclosure relates to a sheet transport device, an image reading device, and an image forming apparatus.

(ii) Related Art

There is known a sheet supply device (Japanese Unexamined Patent Application Publication No. 2009-298599) that includes a stacker on which sheets are to be stacked, a sheet feeding unit that is disposed on the stacker and that separately transports the sheets, a sheet transport path that guides one of the sheets fed by the sheet feeding unit to a predetermined treatment position, a registration unit that is disposed on the sheet transport path and that causes one of the sheets fed by the sheet feeding unit to temporarily stay, a sheet transport unit that is disposed at a position on the transport path between the registration unit and the treatment position and that transports one of the sheets from the registration unit to the treatment position, and a double-feeding sensing unit that detects overlapping of some of the sheets that are transported from the stacker to the treatment position. A portion of the sheet transport path between the registration unit and the treatment position is formed of a pair of guide members facing each other with a gap therebetween, and a portion of the sheet transport path that guides the sheets from the registration unit to the treatment position is formed of a pair of guide members facing each other with a gap therebetween. The double-feeding sensing unit is disposed on the pair of guide members between the registration unit and the sheet transport unit, and a pressing unit that causes the sheets to deviate toward one of the guide members is disposed between the double-feeding sensing unit and the sheet transport unit.

There is also known a sheet supply device (Japanese Unexamined Patent Application Publication No. 2005-001828) that includes a sheet treatment platen, sheet transport rollers that supply sheets to the treatment platen, sheet conveying rollers that convey the sheets from the treatment platen, and a guide member that is disposed so as to face the treatment platen and so as to form a sheet transport path between the guide member and the treatment platen and that extends from the sheet transport rollers to the conveying rollers. The transport rollers are formed of two or more rollers that are spaced apart from each other in a direction perpendicular to a transport direction of the sheets, and an idle roller that is driven by coming into contact with one of the sheets is disposed between these rollers such that the outer periphery of the idle roller and the outer periphery of one of the transport rollers cross each other in the sheet transport direction, so that one of the sheets is guided to the treatment platen by the outer periphery of the transport roller and the outer periphery of the idle roller.

SUMMARY

Aspects of non-limiting embodiments of the present disclosure relate to a sheet transport device, an image reading device, and an image forming apparatus capable of improving the accuracy with which overlapping of sheets that are transported is detected, whereas in a configuration that does not include a guide member that moves by following displacement of a displacement roller in such a manner as to maintain a certain distance from a sensing unit, the accuracy is not improved.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a sheet transport device including a sheet transport path along which at least one sheet is transported to a nip defined by a fixing roller and a displacement roller, a sensing unit disposed on the sheet transport path, an opening and closing member that is movable between a closed position at which the sheet transport path is formed and an open position at which the sheet transport path is exposed, and a guide member that is attached to the opening and closing member and that moves by following displacement of the displacement roller in such a manner as to maintain a certain distance from the sensing unit.

BRIEF DESCRIPTION OF THE DRAWINGS

An exemplary embodiment of the present disclosure will be described in detail based on the following figures, wherein:

FIG. 4 is a block diagram illustrating an example of a functional configuration of the image forming apparatus;

FIG. 5 is a longitudinal schematic sectional view illustrating a sheet transport path including take-away rollers and pre-registration rollers of an automatic document feeding unit;

FIG. 6 is a schematic plan view illustrating the sheet transport path including the take-away rollers and the pre-registration rollers of the automatic document feeding unit;

FIG. 10 is a schematic sectional view illustrating a state in which documents are transported along the sheet transport path.

DETAILED DESCRIPTION

Figure 1:
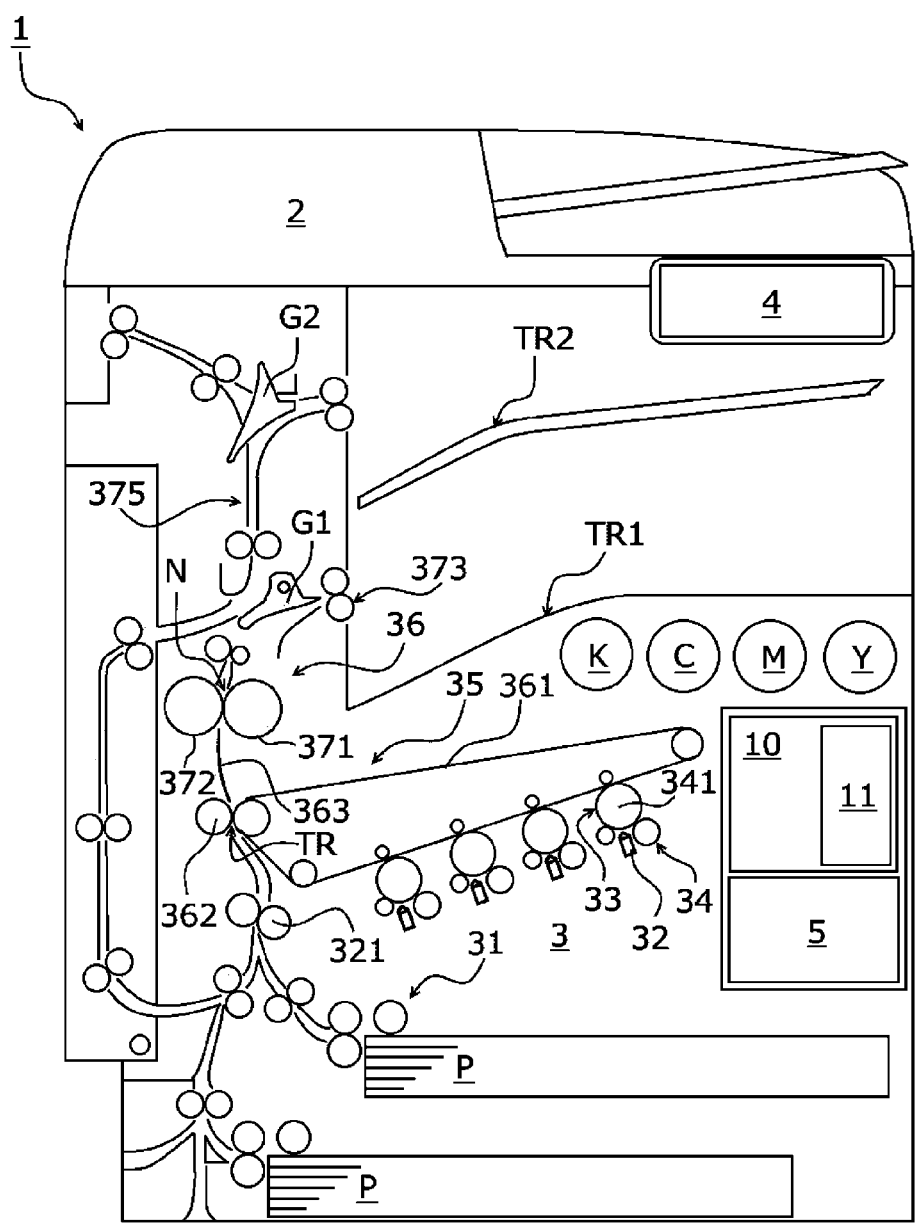
FIG. 1 is a schematic sectional view illustrating an internal configuration of an image forming apparatus.

Although an exemplary embodiment of the present disclosure will now be described in detail below using a specific example and with reference to the drawings, the present disclosure is not limited to the following exemplary embodiment and specific example.

In addition, in the drawings that will be referred to in the following description, objects are schematically illustrated, and it should be noted that dimensional ratios and so forth of the objects that are illustrated in the drawings are different from those of actual objects. Furthermore, in the drawings, illustration of components that are not necessary for the following description is suitably omitted for ease of understanding.

(1) Overall Configuration and Operation of Image Forming Apparatus

Figure 2:
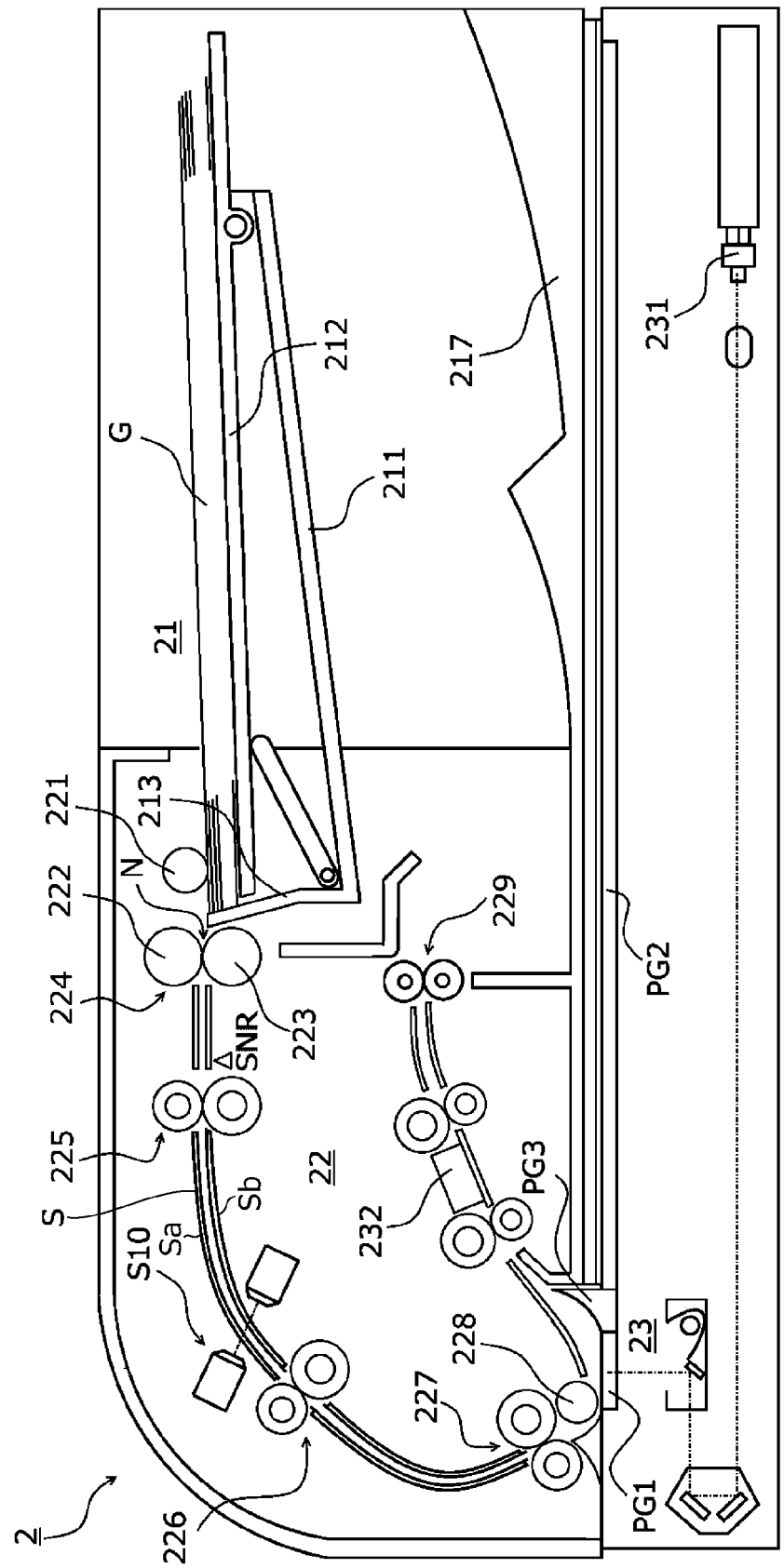
FIG. 2 is a sectional view illustrating an internal configuration of a reading unit.
Figure 3:
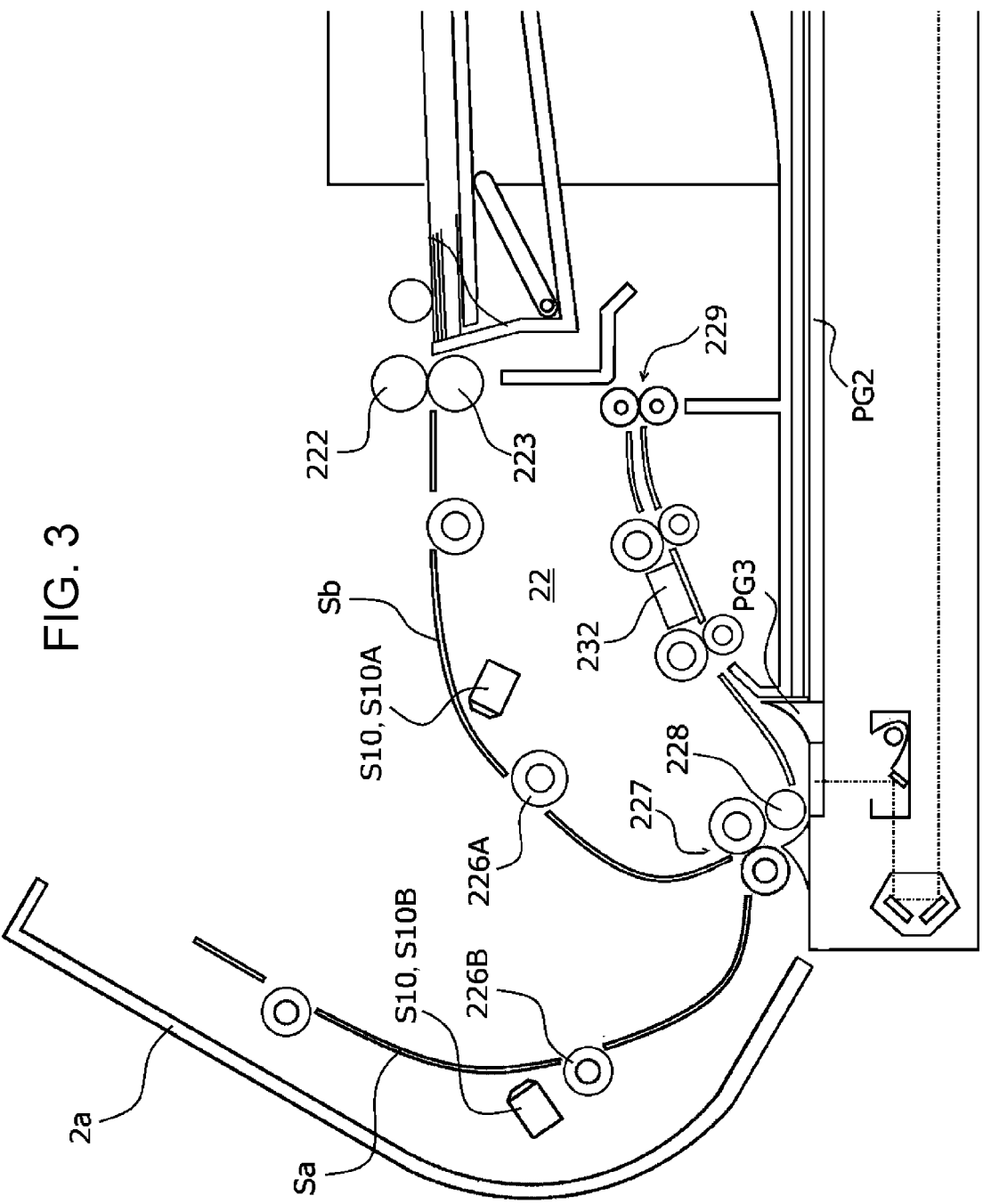
FIG. 3 is a schematic sectional view illustrating an image reading device in a state where a sheet transport path is exposed.

FIG. 1 is a schematic sectional view illustrating an internal configuration of an image forming apparatus 1 according to the present exemplary embodiment of the present disclosure. FIG. 2 is a sectional view illustrating an internal configuration of an image reading device 2. FIG. 3 is a schematic sectional view illustrating the image reading device 2 in a state where a sheet transport path S is exposed. FIG. 4 is a block diagram illustrating an example of a functional configuration of the image forming apparatus 1. The overall configuration and the operation of the image forming apparatus 1 will be described below with reference to the drawings.

(1.1) Overall Configuration

The image forming apparatus 1 includes the image reading device 2 that reads an image from a document and converts the image into image data, an image forming section 3 functioning as an image recording unit that prints the read image data onto a sheet, which is a recording medium, an operation information unit 4 functioning as a user interface, and an image processing unit 5.

The image reading device 2 includes a document stacking unit 21, an automatic document feeding unit 22, and an image reading unit 23. The automatic document feeding unit 22 transports documents G that are placed on the document stacking unit 21 and that are examples of sheets to a reading position of the image reading unit 23, and an image read by an image sensor (not illustrated) such as a charge-coupled device (CCD) line sensor in the image reading unit 23 is converted into image data, which is an electrical signal.

The image forming section 3 includes a sheet feeding device 31, exposure devices 32, photoconductor units 33, developing devices 34, a transfer device 35, and a fixing device 36. The image forming section 3 forms, by using image information received thereby from an image processing unit 5, a toner image onto one of sheets P sent from the sheet feeding device 31.

The operation information unit 4 functioning as a user interface is disposed on the front side of the image reading device 2. The operation information unit 4 is formed by combining a liquid crystal display panel, various operation buttons, a touch panel, and so forth, and a user who uses the image forming apparatus 1 performs various settings and input operations by using the operation information unit 4, which is an example of a receiving unit. The liquid crystal display panel displays various information items to a user who uses the image forming apparatus 1.

The image processing unit 5 generates image data by using an image read by the image reading device 2 and print information transmitted from an external device (e.g., a personal computer).

(1.2) Image Reading Device

The image reading device 2 includes the document stacking unit 21, the automatic document feeding unit 22, and the image reading unit 23. Note that the document stacking unit 21 and the automatic document feeding unit 22 are coupled to each other so as to be capable of being opened and closed above the image reading unit 23.

The document stacking unit 21 includes a document tray 212, and the documents G on which images have been recorded are to be placed on the document tray 212. The document tray 212 is capable of moving up and down in accordance with the number of the documents G stacked thereon and holds the documents G at a raised position at which the top surface of the documents G is in contact with a nudger roller 221.

The automatic document feeding unit 22 includes an isolation unit 224 formed of the nudger roller 221 that picks up the documents G, which are stacked on the document tray 212, one by one starting from the uppermost document G, a feed roller 222 serving as a feeding roller, and a retard roller 223 that separates the documents G from each other while being pressed into contact with the feed roller 222.

The isolation unit 224 is positioned downstream from the document stacking unit 21 in a direction in which the documents G are to be sent out and is formed of the feed roller 222 and the retard roller 223 that is pressed into contact with the feed roller 222 so as to form a nip N. The feed roller 222 rotates in the same direction as the nudger roller 221 and transports the documents G sent out by the nudger roller 221 further toward the downstream side in a transport direction.

In the case illustrated in FIG. 2, the retard roller 223 is driven so as to rotate in a clockwise direction (direction of arrow CW) and is driven so as to rotate in the same direction as the feed roller 222 while at least one of the documents G is nipped therebetween. As a result, the retard roller 223 transports at least one of the documents G toward the upstream side in the transport direction, whereas the feed roller 222 transports the at least one of the documents G toward the downstream side in the transport direction, so that the documents G are separated from each other.

For example, in the case where two of the documents G are sent to the nip N, the friction coefficient between the feed roller 222 and the first document G and the friction coefficient between the retard roller 223 and the second document G are each set to be larger than the friction coefficient between the documents G. As a result, the first document G is transported by the feed roller 222 toward the downstream side in the direction in which the documents G are to be sent, and the second document G is transported by the retard roller 223 toward the upstream side in the direction in which the documents G are to be sent, so that the two documents G are separated from each other.

Take-away rollers 225 that are formed of a pair of rollers are disposed at positions on the sheet transport path S, the positions being downstream from the feed roller 222 in the transport direction of the documents G. The take-away rollers 225 transport one of the documents G sent out by the feed roller 222 to pre-registration rollers 226 that are disposed at positions downstream from the take-away rollers 225.

A feed-out sensor SNR is disposed at a position upstream from the take-away rollers 225. The feed-out sensor SNR is formed of a light-reflective optical sensor and detects the leading end of one of the documents G so as to act as a trigger for bringing the document G, which is transported from the isolation unit 224, into contact with the take-away rollers 225, which are not rotating, and forming the document G into a loop. A feed amount that corresponds to a predetermined number of pulses is set after the feed-out sensor SNR has been switched on, and one of the documents G is formed into a loop.

Then, the take-away rollers 225 are driven so as to rotate, and the size of the transported document G in the direction in which the document G is sent is detected during the period from when the trailing end of the document G passes over the feed-out sensor SNR until the feed-out sensor SNR is switched off.

The sheet transport path S includes an upper guide Sa and a lower guide Sb that are arranged with a predetermined gap therebetween so as to form a transport path for the documents G and forms a transport path that is substantially U-shaped and that extends toward registration rollers 227. The upper guide Sa is fixed to the inner surface of an opening and closing cover 2a serving as an opening and closing member that covers the automatic document feeding unit 22, and as illustrated in FIG. 3, the transport path included in the sheet transport path S is exposed by opening the opening and closing cover 2a, so that an operation for clearing a paper jam in the sheet transport path S may be performed.

On the sheet transport path S, the pre-registration rollers 226 are disposed at positions downstream from the take-away rollers 225. The pre-registration rollers 226 are a pair of transport rollers formed of a fixing roller 226A that is driven so as to rotate and a displacement roller 226B that is movably pressed into contact with the fixing roller 226A by a pressing unit (not illustrated), such as a spring, and that is driven and rotated. The pre-registration rollers 226 bring the leading end of one of the documents G into contact with the registration rollers 227, which are not rotating, and forms the document G into a loop.

A double-feeding detecting sensor S10 is disposed between the take-away rollers 225 and the pre-registration rollers 226 so as to be closer to the pre-registration rollers 226 than the take-away rollers 225 and detects double feeding (multiple feeding) of the documents G sent out by the take-away rollers 225. This enables the automatic document feeding unit 22 to detect double feeding while being further reduced in size.

The registration rollers 227 that adjust the timing of transportation of the documents G are disposed at positions downstream from the pre-registration rollers 226. The pre-registration rollers 226 correct skewing of one of the documents G by bringing the leading end of the document G into contact with the registration rollers 227, which are not rotating, and forming the document G into a loop. The registration rollers 227 are driven so as to rotate in accordance with the timing at which a reading operation is started. The document G is pressed against a document-passing surface PG1 by a platen roller 228 while formed in a loop by the take-away rollers 225 and the pre-registration rollers 226, and the front surface of the document G is read by the image reading unit 23.

A document-placement surface PG2 on which one of the documents G, which is placed by an operator, is supported is disposed on the right-hand side of the document-passing surface PG1. A document guide PG3 is disposed between the document-passing surface PG1 and the document placement surface PG2, and one of the documents G that has passed over the document-passing surface PG1 is guided by the document guide PG3 and transported to a reading sensor 232. One of the documents G whose front surface has been read by the image reading unit 23 is ejected to a sheet ejection unit 217, which is formed below the document stacking unit 21, by ejection rollers 229 while the rear surface thereof is read by the reading sensor 232.

An image reading sensor 231 that optically reads an image of one of the documents G and converts the image into an electrical signal is disposed below the document-placement surface PG2. The image reading sensor 231 reads an image of one of the documents G that passes over the document-passing surface PG1 or an image of one of the documents G that is placed on the document-placement surface PG2. The read image is converted into image data, which is an electrical signal.

(1.3) Image Forming Section

In the image forming section 3, the sheets P each of which is specified to be subjected to a printing operation by a print job are sent to the image forming section 3 one by one from the sheet feeding device 31 in accordance with the timing at which image formation is performed.

The photoconductor units 33 are arranged side by side above the sheet feeding device 31 (arranged in a row in the Z direction), and each of the photoconductor units 33 includes a photoconductor drum 341 that is driven so as to rotate. The developing devices 34 form toner images of yellow (Y), magenta (M), cyan (C), and black (K) onto the corresponding photoconductor drums 341, on which electrostatic latent images have been formed by the corresponding exposure devices 32.

The toner images of the different colors formed on the photoconductor drums 341 of the photoconductor units 33 are sequentially and electrostatically transferred (in a first transfer process) onto an intermediate transfer belt 361 of the transfer device 35 and superposed with one another, so that a superposed toner image is formed. The superposed toner image on the intermediate transfer belt 361 is transferred, by a second transfer roller 362, onto one of the sheets P that is sent out by a pair of registration rollers 321 and that is guided by a transport guide.

In the fixing device 36, a fixing nip FN (a fixing region) is formed of a region in which a heating module 371 and a pressing module 372 that are paired with each other are pressed into contact with each other.

One of the sheets P to which toner images have been collectively transferred by the transfer device 35 is transported to the fixing nip FN of the fixing device 36 by a transport guide 363 in a state where the toner images are unfixed to the sheet P, and the toner images are fixed onto the sheet P as a result of pressure and heat being applied thereto by the heating module 371 and the pressing module 372, which are paired with each other.

The sheet P to which the fixed toner images have been formed is guided by a switching gate G1 and ejected to a sheet-ejection tray unit TR1 located at the top surface of the image forming apparatus 1, by a first pair of ejection rollers 373 so as to be accommodated in the sheet-ejection tray unit TR1. In addition, in the case of flipping over the sheet P in order to perform two-sided printing on the sheet P and in the case of ejecting the sheet P while the surface of the sheet P on which the images have been recorded faces upward, the transport direction is switched toward a transport path 375 by the switching gate G1.

(1.3) Block Configuration of Image Forming Apparatus

The image forming apparatus 1 includes a system control section 10 that includes an image-output control unit 11, a reading control unit 12, a power-supply control unit 13, a light-exposure control unit 14, and a fixation-temperature control unit 15. The system control section 10 performs overall operational control of the entire image forming apparatus 1 by running a control program stored in memory.

The image-output control unit 11 issues operational control instructions to the sheet feeding device 31, the exposure devices 32, the photoconductor units 33, the developing devices 34, the transfer device 35, the fixing device 36, and so forth, which are included in the image forming section 3.

In addition, the image-output control unit 11 issues operational control instructions to the power-supply control unit 13, the light-exposure control unit 14, and the fixation-temperature control unit 15, which are included in the system control section 10. In other words, the image-output control unit 11 determines whether to perform power feeding to and driving of the sheet feeding device 31, the exposure devices 32, the photoconductor units 33, the developing devices 34, the transfer device 35, the fixing device 36, and so forth, which are included in the image forming section 3, and issues instructions according to the determination results to the control units.

Furthermore, the image-output control unit 11 transmits and receives information to and from the reading control unit 12, and when the image-output control unit 11 receives an image reading instruction via the operation information unit 4, the image-output control unit 11 performs predetermined image reading control.

The reading control unit 12 controls the operation of the image reading device 2 such that an image of one of the documents G stacked on the document stacking unit 21 is read by being scanned while the document G is transported to the image reading unit 23 through the automatic document feeding unit 22 and receives the read image data. The received image data is stored in a memory (an HDD).

(2) Configuration and Operation of Sheet Transport Path

Figure 7A:
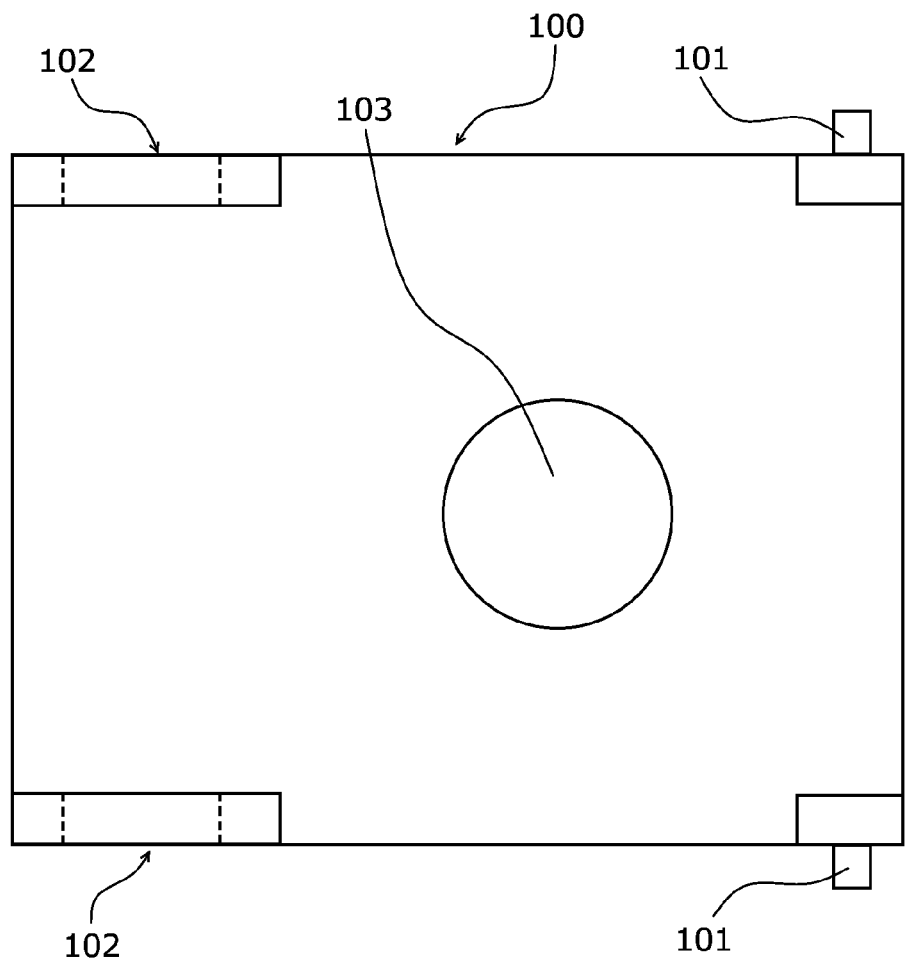
FIGS. 7A and 7B are diagrams illustrating a guide member.
Figure 7B:
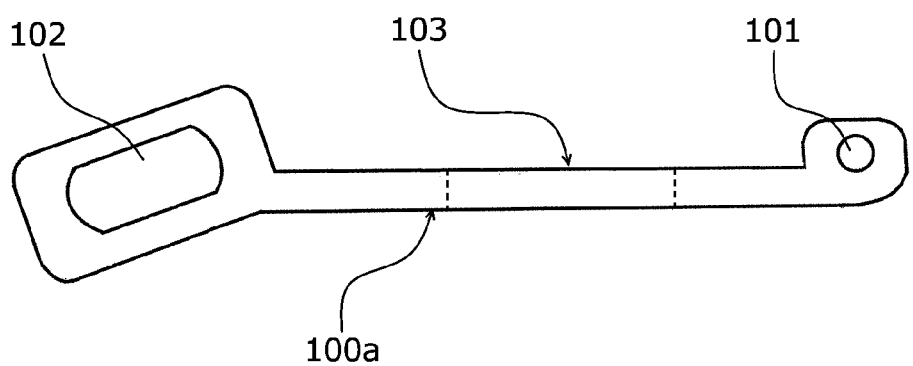
Figure 8:
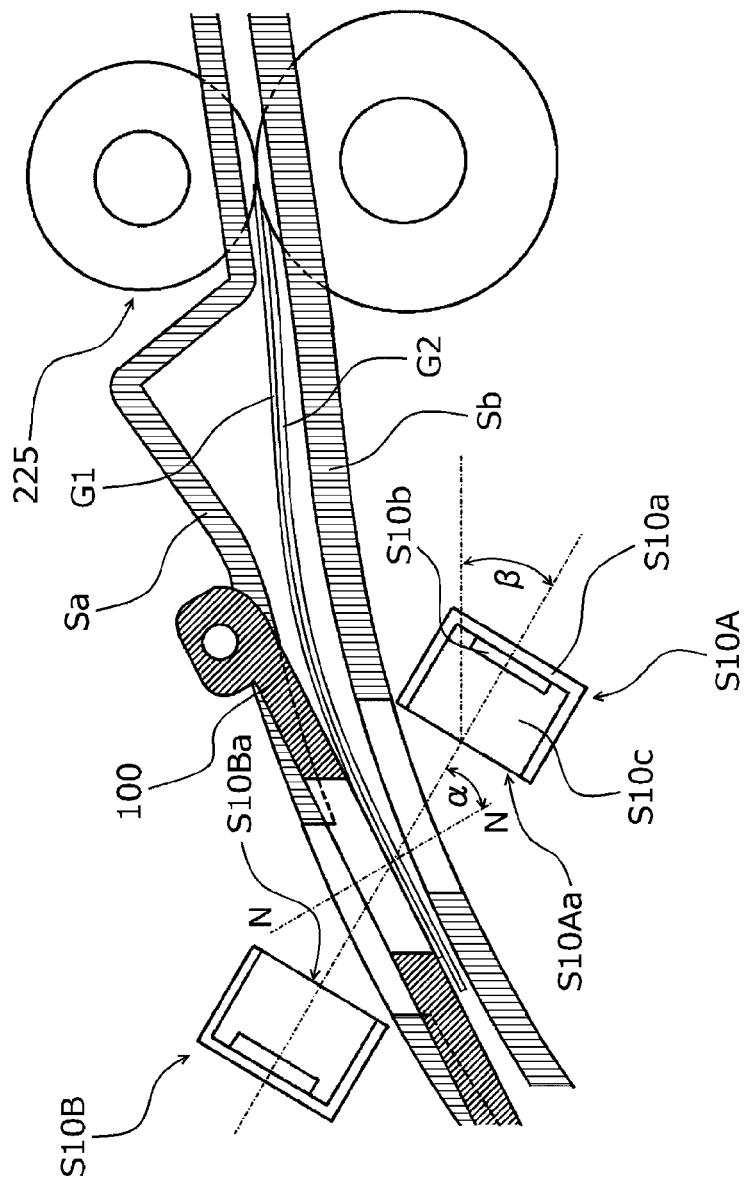
FIG. 8 is a schematic sectional view illustrating the position of a double-feeding detecting sensor.
Figure 9A:
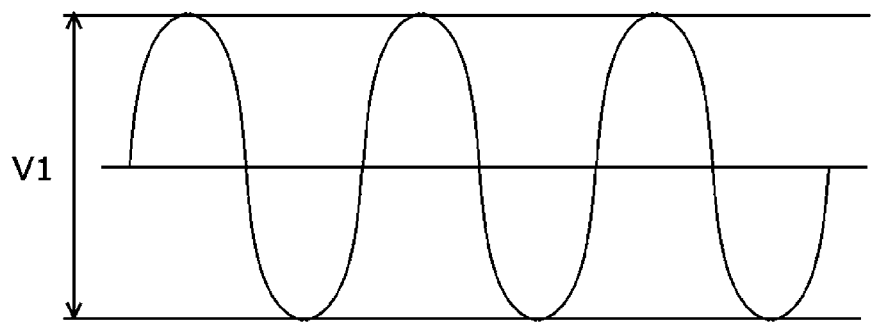
FIGS. 9A, 9B, and 9C are diagrams illustrating examples of signals of the double-feeding detecting sensor.
Figure 9B:
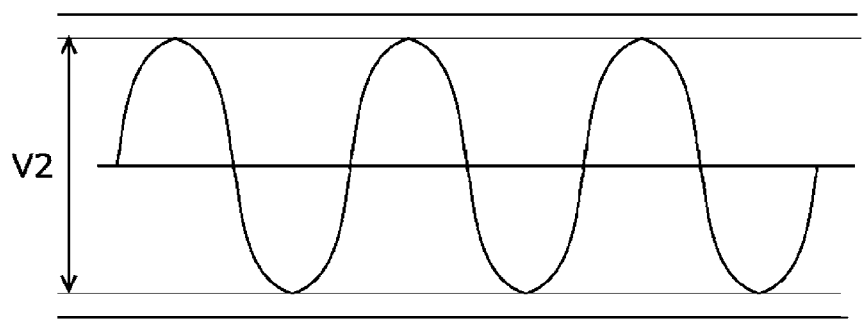
Figure 9C:
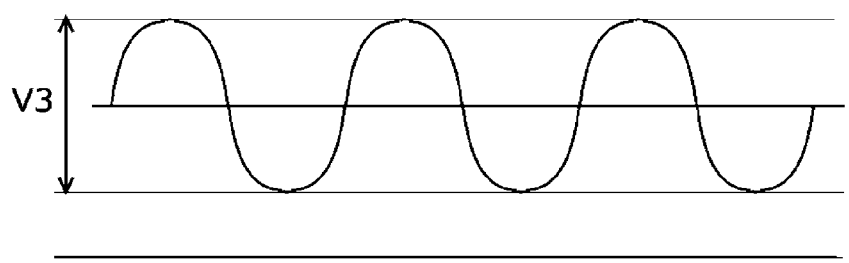
Figure 11:
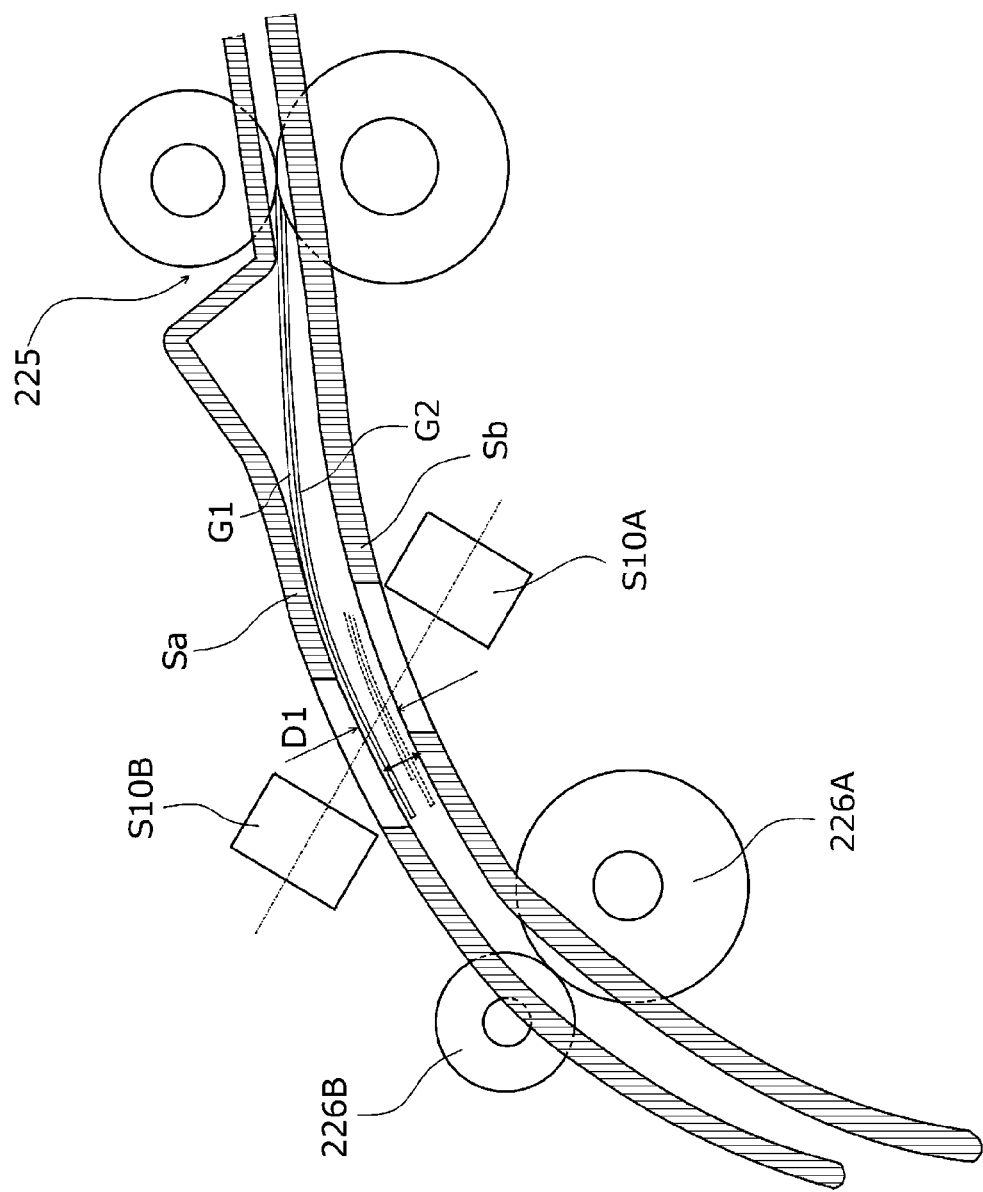
FIG. 11 is a longitudinal schematic sectional view illustrating a state in which documents are transported along a sheet transport path according to a comparative example.

FIG. 5 is a longitudinal schematic sectional view illustrating the sheet transport path S including the take-away rollers 225 and the pre-registration rollers 226 of the automatic document feeding unit 22. FIG. 6 is a schematic plan view illustrating the sheet transport path S including the take-away rollers 225 and the pre-registration rollers 226 of the automatic document feeding unit 22. FIGS. 7A and 7B are diagrams illustrating a guide member 100. FIG. 8 is a schematic sectional view illustrating the position of the double-feeding detecting sensor S10. FIGS. 9A, 9B, and 9C are diagrams illustrating examples of signals of the double-feeding detecting sensor S10. FIG. 10 is a schematic sectional view illustrating a state in which some of the documents G are transported along the sheet transport path S. FIG. 11 is a longitudinal schematic sectional view illustrating a state in which some of the documents G are transported along a sheet transport path S1 according to a comparative example. The configuration and the operation of the automatic document feeding unit 22 will be described below with reference to the drawings.

In the automatic document feeding unit 22, one of the documents G stacked on the document stacking unit 21 is separated from the other documents G by the isolation unit 224, and the document G is sent out to the image reading unit 23 by the take-away rollers 225, the pre-registration rollers 226, and the registration rollers 227, which are arranged on the sheet transport path S.

As illustrated in FIG. 5 and FIG. 6, the double-feeding detecting sensor S10 that is an example of a sensing unit and that detects double feeding (overlapping) of the documents G that are transported is disposed between the take-away rollers 225 and the pre-registration rollers 226.

The double-feeding detecting sensor S10 is an ultrasonic sensor, and as illustrated in FIG. 8, a transmitting element S10A and a receiving element S10B are formed of elements having the same structure. In each of the transmitting element S10A and the receiving element S10B, a piezoelectric vibrator S10b, such as a piezoelectric ceramic plate, is placed in a metal case S10a and embedded in an elastic resin S10c.

High-frequency waves obtained by amplifying a high-frequency signal of, for example, 30 KHz to 400 KHz is supplied from a high-frequency oscillation circuit (not illustrated) to each of the piezoelectric vibrators S10b. Each of the piezoelectric vibrator S10b is in close contact with a corresponding one of the cases S10a and vibrates at a specific frequency based on the natural frequency at which the piezoelectric vibrator S10b and the case S10a are integrated with each other, so that ultrasonic waves at a high frequency of a constant amplitude (FIG. 9A: output level V1) are emitted from a transmitting surface S10Aa, which forms a portion of one of the cases S10a.

In contrast, the receiving element S10B is caused to resonate by ultrasonic waves received by a receiving surface S10Bb of the other of the cases S10a and the corresponding piezoelectric vibrator S10b, which is integrated with the case S10a, and outputs electrical power generated thereby as a signal. Regarding attenuation of the ultrasonic waves that pass through at least one of the documents G to be transported, as schematically illustrated in FIGS. 9B and 9C, the output in the case where one of the documents G is transported (FIG. 9B: output level V2) and the output in the case where two of the documents G are transported (FIG. 9C: output level V3) are different from each other, and this enables detection of the transported documents G overlapping each other.

In the double-feeding detecting sensor (an ultrasonic sensor) S10 having the above-described structure, as illustrated in FIG. 8, the transmitting element S10A and the receiving element S10B are arranged so as to face each other while being inclined at a predetermined angle with respect to one of the documents G that is transported along the sheet transport path S.

More specifically, the transmitting element S10A and the receiving element S10B are disposed in such a manner as to be inclined at an angle α with respect to a line N-N that is perpendicular to the sheet transport path S (angle α: 30 degrees to 45 degrees). This prevents interference between oscillation waves and reflected waves that occurs as a result of ultrasonic waves generated by oscillation of the transmitting element S10A being reflected by a surface of one of the documents G and returning to the transmitting surface S10Aa of the transmitting element S10A. In addition, similar interference is prevented from occurring between a surface of one of the documents G and the receiving surface S10Bb of the receiving element S10B.

In the direction of gravity, the transmitting element S10A is disposed below the sheet transport path S, and the receiving element S10B is disposed above the sheet transport path S in order to reduce the influence of paper dust and other dust that fall from the sheet transport path S on the detection accuracy. In addition, the transmitting element S10A on the lower side is disposed in such a manner that the transmitting surface S10Aa thereof is inclined at an angle β with respect to the horizontal direction (angle β: 60 degrees to 70 degrees) in order to cause dust to spontaneously fall from the transmitting surface S10Aa or fall downward with the help of ultrasonic vibration.

FIG. 11 illustrates an example of a sheet transport path S1 according to a comparative example that does not include the guide member 100. The sheet transport path S1 includes the upper guide Sa and the lower guide Sb that are arranged with a gap D1 therebetween. Since the upper guide Sa is fixed to the inner surface of the opening and closing cover 2a, which is openable and closable, it is difficult to set the gap D1 of the transport path to be small when considering variations of positioning accuracy.

When the documents G (G1 and G2) each of which is formed in a loop are sent out to the double-feeding detecting sensor S10, which is disposed on the sheet transport path S1, by the take-away rollers 225, the leading end portions of the documents G (G1 and G2) are likely to flap (see arrows in FIG. 11), and there is a possibility that values that are detected by the double-feeding detecting sensor S10 will become unstable. After the documents G (G1 and G2) have reached the pre-registration rollers 226, the documents G (G1 and G2) are transported along the upper guide Sa while being nipped between the take-away rollers 225 and between the pre-registration rollers 226, so that the flap becomes stable. Then, when the trailing end portions of the documents G (G1 and G2) are released from being nipped between the take-away rollers 225, the trailing end portions are likely to flap, and there is a possibility that values that are detected by the double-feeding detecting sensor S10 will become unstable.

In the present exemplary embodiment, the sheet transport path S includes the guide member 100 that is attached to the opening and closing cover 2a and that moves by following displacement of the displacement roller 226B of the pre-registration rollers 226 in such a manner as to maintain a certain distance from the double-feeding detecting sensor S10.

As illustrated in FIGS. 7A and 7B, the guide member 100 is a plate-shaped member having a rectangular overall shape and includes a boss 101 provided at a first end of the guide member 100 and a long-hole portion 102 provided at a second end of the guide member 100. The boss 101 serves as a rotation fulcrum, and the long-hole portion 102. A shaft 226C by which the displacement roller 226B is rotatably supported is inserted into the long-hole portion 102, so that the long-hole portion 102 moves by following displacement of the displacement roller 226B.

In addition, a through hole 103 is formed in a substantially central portion of a document-guide surface 100a of the guide member 100, and the transmitting element S10A and the receiving element S10B of the double-feeding detecting sensor S10 are disposed so as to face each other through the through hole 103.

As illustrated in FIG. 5, the guide member 100 having such a configuration is disposed in such a manner that the boss 101 is rotatably supported by the upper guide Sa at a position downstream from the take-away rollers 225 and that the long-hole portion 102 is capable of moving by following displacement of the displacement roller 226B of the pre-registration rollers 226 as a result of the shaft 226C being inserted into the long-hole portion 102.

In addition, as illustrated in FIG. 6, when viewed in plan view, a sheet-guide surface of the upper guide Sa is divided into two portions, and the guide member 100 is disposed so as to function as a portion of the sheet-guide surface.

In the present exemplary embodiment, although a case has been described in which an upstream portion of the guide member 100 is rotatably supported by the upper guide Sa, the upstream portion of the guide member 100 may be rotatably supported by a shaft portion of a movable roller 225B of the take-away rollers 225 as long as a downstream portion of the guide member 100 is movably supported by the shaft 226C, by which the displacement roller 226B is rotatably supported.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A sheet transport device comprising:
   a sheet transport path along which at least one sheet is transported to a nip defined by a fixing roller and a displacement roller;
   a sensing unit disposed on the sheet transport path;
   an opening and closing member that is movable between a closed position at which the sheet transport path is formed and an open position at which the sheet transport path is exposed; and
   a guide member that is attached to the opening and closing member and that moves by following displacement of the displacement roller in such a manner as to maintain a certain distance from the sensing unit,
   wherein the guide member has a first end portion that is rotatably supported by the opening and closing member and a second end portion that is fitted into a rotary shaft of the displacement roller so as to be movable in a transport direction of the sheet and moves by following displacement of the displacement roller.

2. The sheet transport device according to claim 1, wherein, in the transport direction of the sheet, the first end portion of the guide member is located at a position upstream from the sensing unit, and the second end portion of the guide member is located at a position downstream from the sensing unit in such a manner that the guide member covers the sensing unit.

3. The sheet transport device according to claim 1, wherein the guide member is formed by being separated from a sheet-guide surface of the sheet transport path.

4. The sheet transport device according to claim 1, wherein the sheet transport path includes a curved transport path that is curved, and
   wherein the sensing unit is disposed in such a manner as to sandwich the curved transport path.

5. The sheet transport device according to claim 1, wherein the sensing unit is a double-feeding detecting sensor that detects overlapping of a plurality of the sheets.

6. An image reading device comprising:
   an imaging unit that reads an image of a document; and
   the document transport device according to claim 1 that transports the document to a reading position at which the imaging unit reads the document.

7. An image forming apparatus comprising:
   the image reading device according to claim 6 that reads an image of a document; and
   an image recording unit that records an image read by the image reading device on a recording medium.

* * * * *